US010360793B1

(12) United States Patent
Costantini et al.

(10) Patent No.: US 10,360,793 B1
(45) Date of Patent: Jul. 23, 2019

(54) PREVENTING VEHICLE ACCIDENT CAUSED BY INTENTIONAL MISBEHAVIOR

(71) Applicant: INTERNATIONAL BUSINESS MACHINES CORPORATION, Armonk, NY (US)

(72) Inventors: Eliseba Costantini, Rome (IT); Alice Guidotti, Rome (IT); Daniele Morgantini, Rome (IT); Marco Vettori, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/985,898

(22) Filed: May 22, 2018

(51) Int. Cl.
  *G06K 9/00* (2006.01)
  *G07C 5/00* (2006.01)
  *G08G 1/01* (2006.01)

(52) U.S. Cl.
  CPC ....... *G08G 1/0112* (2013.01); *G06K 9/00791* (2013.01); *G07C 5/008* (2013.01)

(58) Field of Classification Search
  CPC ................. G08G 1/0112; G06K 9/00791
  USPC .................................. 340/901, 902, 933
  See application file for complete search history.

(56) References Cited

U.S. PATENT DOCUMENTS

| | | | |
|---|---|---|---|
| 4,203,098 A | 5/1980 | Muncheryan | |
| 5,635,922 A | 6/1997 | Cho et al. | |
| 8,013,747 B2 | 9/2011 | Chen | |
| 8,971,927 B2 | 3/2015 | Zhou et al. | |
| 9,047,752 B2 | 6/2015 | Bichara | |
| 2002/0049619 A1* | 4/2002 | Wahlbin | G06Q 10/10 705/4 |
| 2003/0212567 A1* | 11/2003 | Shintani | G06Q 99/00 725/105 |
| 2008/0255722 A1* | 10/2008 | McClellan | B60R 25/102 701/31.4 |
| 2010/0194558 A1* | 8/2010 | Toh | G08G 1/162 340/539.1 |
| 2013/0144459 A1 | 6/2013 | Ricci | |

(Continued)

OTHER PUBLICATIONS

Mell et al., "The NIST Definition of Cloud Computing," National Institute of Standards and Technology, Sep. 2011, p. 1-3, Special Publication 800-145.

*Primary Examiner* — Emily C Terrell
(74) *Attorney, Agent, or Firm* — Nichole A. Spence

(57) ABSTRACT

A method, computer system, and a computer program product for detecting and managing a vehicle violation by utilizing a plurality of feedback is provided. Embodiments of the present invention may include detecting a violation by a vehicle, wherein the vehicle includes a vehicle device, wherein nearby vehicles are notified of the violation by emitting an alarm. Additional embodiments of the present invention may include detecting a violation by a violating vehicle by utilizing sensors. Additional embodiments of the present invention may then include detecting a witness and recording feedback received by a witness. Additional embodiments of the present invention may further include evaluating the recorded feedback and gathered information on the violation and determining a sufficiency of the feedback and gathered information to verify whether the detected violation is valid. Additional embodiments of the present invention may further include storing the feedback and gathered information in a global knowledge base.

20 Claims, 8 Drawing Sheets

(56) References Cited

U.S. PATENT DOCUMENTS

2015/0246654 A1* 9/2015 Tadic .................... B60W 40/09
                                                      340/436
2017/0140652 A1   5/2017 Hodges et al.
2017/0305434 A1  10/2017 Ratnasingam \* cited by examiner

PREVENTING VEHICLE ACCIDENT CAUSED BY INTENTIONAL MISBEHAVIOR

BACKGROUND

The present invention relates generally to the field of computing, and more particularly to electronically implemented vehicle safety and traffic measures.

Since the turn of the 20th century, vehicles have been a popular form of transportation for humans. However, with the increased popularity of the vehicles, there has been an increase in vehicle related traffic accidents. Therefore, there is an increased demand for more vehicle traffic safety to protect pedestrians, vehicle drivers and vehicle occupants.

SUMMARY

Embodiments of the present invention disclose a method, computer system, and a computer program product for detecting and managing a vehicle violation by utilizing a plurality of feedback. Additional embodiments of the present invention may include detecting a violation by a violating vehicle by utilizing sensors associated with the vehicle, wherein the vehicle includes a vehicle device, wherein a plurality of nearby vehicles are notified of the detected violation by emitting an alarm by utilizing at least one actuator from the violating vehicle. Additional embodiments of the present invention may then include detecting at least one witness for the detected violation by the violating vehicle. Additional embodiments of the present invention may also include recording at least one piece of feedback associated with the plurality of feedback received by at least one detected witness. Additional embodiments of the present invention may further include evaluating the recorded feedback and a plurality of gathered information on the detected violation by the violating vehicle. Additional embodiments of the present invention may then include determining a sufficiency of the evaluated feedback and the evaluated plurality of gathered information to verify whether the detected violation is valid based on a plurality of road rules and maps, wherein the evaluated feedback and the evaluated plurality of gathered information is compared to a threshold to determine the validity of the detected violation. Additional embodiments of the present invention may further include storing the determined feedback and the determined plurality of gathered information in a global knowledge base.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
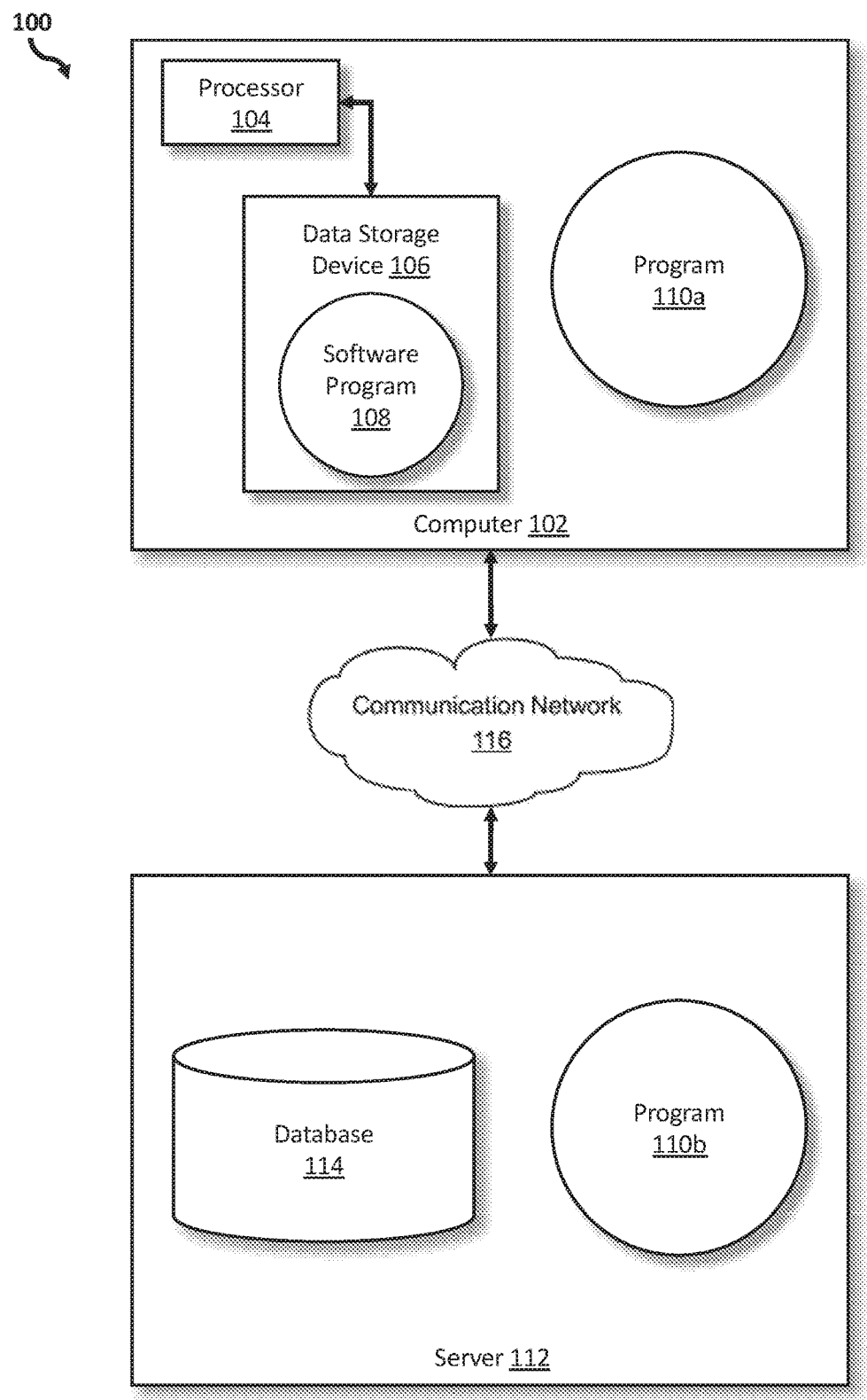
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for detecting and managing a vehicle violation by utilizing a plurality of feedback. As such, the present embodiment has the capacity to improve the technical field of electronically implemented vehicle safety and traffic measures by detecting intentional misbehavior of a vehicle driver based on witness feedback and location tracking services. More specifically, the program may detect the prohibited behavior and may then detect whether any witness is available and record whether any witness information is available. Then, the program may evaluate whether the feedback provided by the witness was positive or negative, and may record any explicit feedback as well as any implicitly negative feedback if no feedback is received. The information on witness availability and feedback may then be evaluated by the program, and the program may determine whether enough information has been gathered on the behavior of the specific driver. If enough information has been gathered, then the program may update a knowledge base. If, however, enough information was not gathered, then the program may request a determination from the appropriate authorities.

As previously described, since the turn of the 20th century, vehicles have been a popular form of transportation for humans. However, with the increased popularity of the vehicles, there has been an increase in vehicle related traffic accidents. Therefore, there is an increased demand for more vehicle traffic safety to protect pedestrians, vehicle drivers and vehicle occupants.

Additionally, the lack of civic mindedness in the community has played a role in the increase in vehicle accidents, especially vehicle accidents caused by intentional misbehavior. Therefore, it may be advantageous to, among other things, prevent vehicle accidents due to intentional misbehavior by leveraging the observation and consequent judgment of the community. Using data associated with maps and feedback from other drivers, the program recognizes prohibited driving behaviors and warns users and drivers of surrounding vehicles.

According to at least one embodiment, the program may analyze a driver's prohibited behavior, and if possible avoid a potential vehicle accident due to that prohibited behavior, as well as avoid the repetition of that prohibited behavior by the driver and other drivers. The present embodiment may include the program utilizing driver feedback to learn whether a specific behavior is prohibited, or if there is an error in a knowledge base associated with the program. Driver feedback and data from location tracking services (e.g., maps) may be utilized to recognize prohibited behavior (i.e., violations) and emit a warning signal for the user and other drivers in surrounding vehicles.

According to at least one embodiment, the program may be installed in each vehicle, and may leverage the knowledge base of maps and allowed routes. When a vehicle moves, the program may collect real-time information related to the road, through sensors and location tracking services (e.g., global positioning services (GPS), acceleration and gyroscope sensors). The program may detect, through a Violation Detection Module, using sensor data as input, a violation of the allowed route. When the infringement (e.g., violation) is detected, an alarm (e.g., simultaneous flashing lights) may be sent to the driver and the surrounding vehicles. The alarm may signal a possible hazard and may inhibit the prohibited behavior by highlighting it.

According to at least one embodiment, the driver performing the prohibited behavior may be precluded from preventing the alarming signal. The present embodiment may include a peer to peer communication, which may be established with the surrounding vehicles in which the alarming signal may be stopped (with an easy gesture) and may simultaneously send feedback confirming that the driver emitting the warning signal is indeed exhibiting prohibited behavior.

According to at least one embodiment, if a particular prohibited behavior occurs a number of times over a given threshold from the data collected from a great number of users and no feedback is received, then the program may determine that such a behavior is no longer prohibited and the knowledge base (local and global) may be updated accordingly. Therefore, the program may no longer emit a warning signal the next time a vehicle driver performs that specific behavior.

According to at least one embodiment, the program may include a witness feedback option in which a witnessing user may provide feedback on possible prohibited behavior. For example, on the screen of the computer connected to the program and in the vehicle, there may be two buttons to provide negative or positive feedback on the prohibited behavior (e.g., red button indicating positive feedback and a green button indicating negative/affirmative feedback, a button with a "X" indicating positive feedback and a button with a checkmark indicating negative/affirmative feedback, "Yes" button indicating negative/affirmative feedback or "No" button indicating positive feedback). The buttons utilized may be intuitive and constitute a simple gesture for a witness to provide feedback on the prohibited behavior of a driver. If the witnessing user selects the green button associated with the possible prohibited behavior of another driver, providing a negative feedback affirming that the vehicle is engaged in prohibited behavior, then the program may confirm that the behavior of the other driver is indeed prohibited. If, however, the witnessing user selects the red button associated with the possible prohibited behavior of another driver, providing a positive feedback that the vehicle is not engaged in prohibited behavior, then the program may determine that the behavior is appropriate and permitted. If the program registers that there are witnesses and no feedback, then the questionable behavior of the other driver may be deemed prohibited. If, however, there are no witnesses registered by the program, then the questionable behavior may be labeled as prohibited behavior without feedback.

According to at least one embodiment, the program may verify whether witnesses are detected by means of transmitter-receiver devices in a certain range and whether the witness provided feedback. The program may record and track positive feedback, and negative feedback may be recorded and tracked as explicitly negative feedback. The program may also record and track no feedback as implicitly negative feedback. In the present embodiment, the program may collect and aggregate the feedback history for a specific questionable behavior to update the knowledge base. If no witnesses are present and the feedback history for a specific questionable behavior is limited, the program may decide whether the specific questionable behavior is permitted based on the number of users performing that specific questionable behavior, or request official feedback from the authorities in charge.

According at least one embodiment, the program may determine the validity of a witness. The program may implement a rule-based engine that considers several factors: (1) type of violation; (2) absolute position (in range with violating at the time of violation); (3) relative position and orientation; (4) same altitude; (5) visibility situation; and (6) reliability of the witness. The present embodiment may consider the feedback history of the potential witness, whether the past feedback provided by the potential witness aligns with other witnesses, and the personal driving behavior of the potential witness.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a program 110*a*. The networked computer environment 100 may also include a server 112 that is enabled to run a program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 6, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the program 110a, 110b (respectively) to detecting intentional misbehavior of vehicle driver based on witness feedback and location tracking services. The vehicle behavior detection method is explained in more detail below with respect to FIGS. 2-5.

Figure 2:
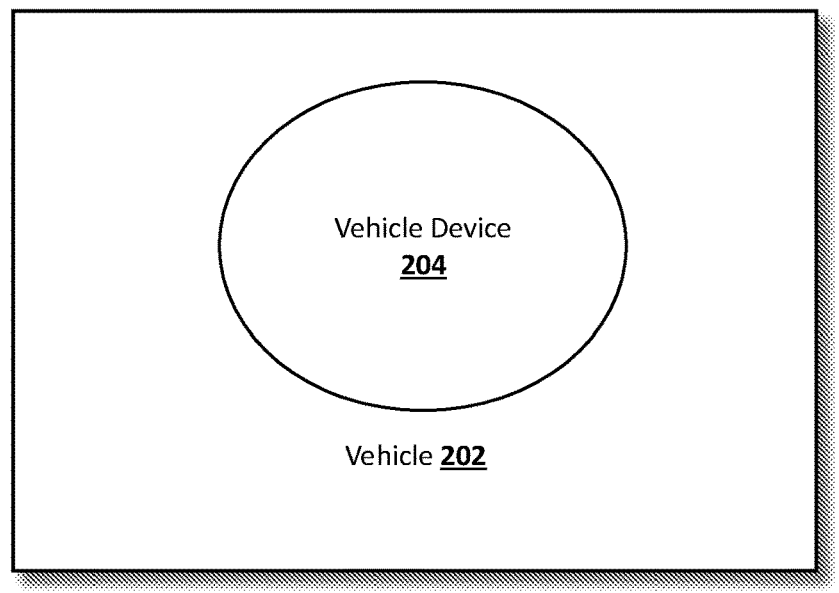
FIG. 2 illustrates a vehicle device environment according to at least one embodiment.

Referring now to FIG. 2, an exemplary vehicle device environment 200 in accordance with one embodiment is depicted. As shown, the vehicle device environment 200 comprises a vehicle 202. The vehicle device 204 associated with the program 110a may be located inside each vehicle 202. The specific location or acceptable types of the vehicle device 204 within the vehicle 202 may depend on the specific manufacturer of the vehicle 202 associated with the vehicle device 204. While the vehicle 202 is in motion, the program 110a may collect real-time information, via the vehicle device 204, on the roads travelled by the vehicle 202.

In the present embodiment, a vehicle device 204 may include a smart phone associated with the user of the vehicle 202. To properly utilize the program 110a, 110b, the smart phone (or other form of portable vehicle devices 204) may be located or installed inside of the vehicle 202.

Figure 3:
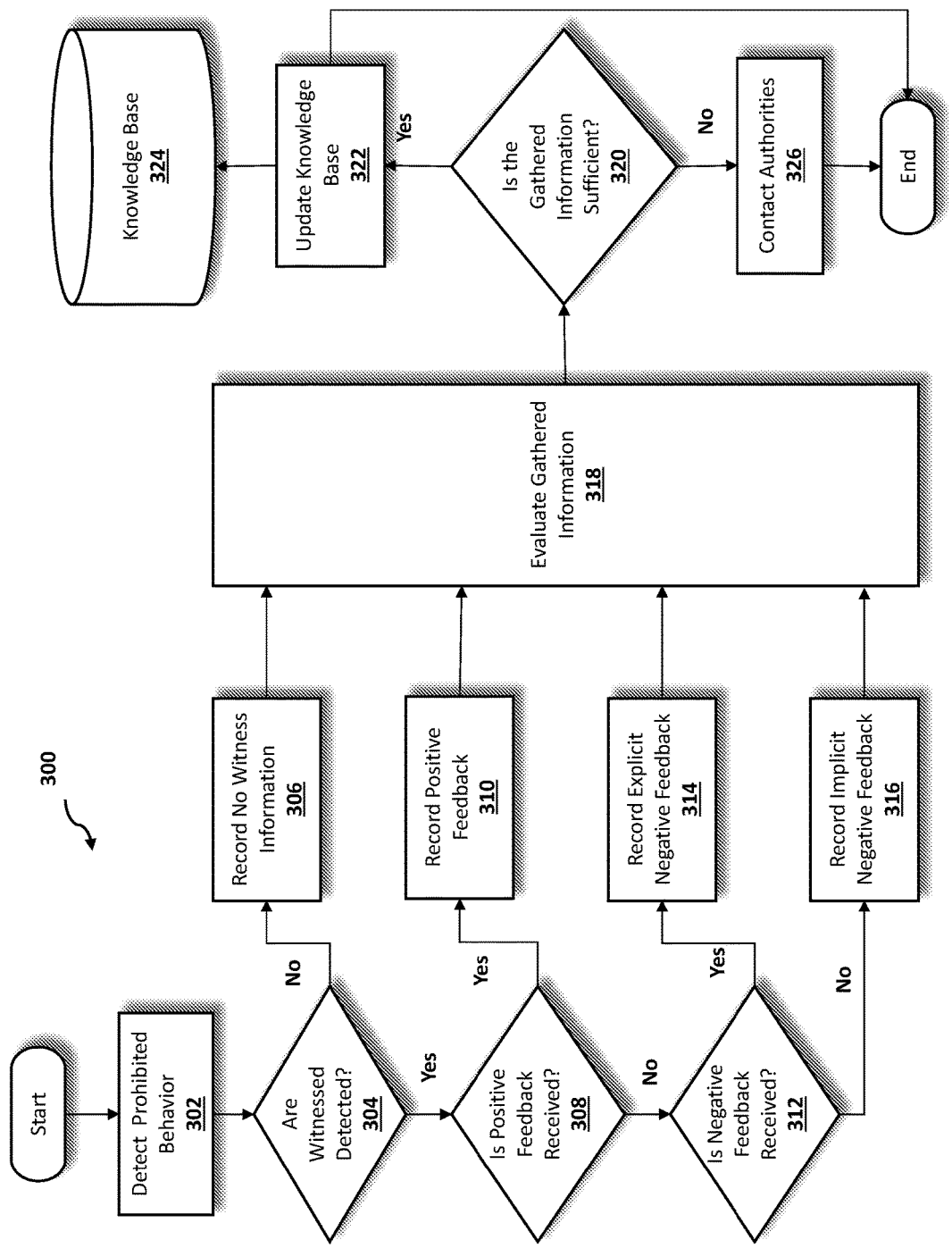
FIG. 3 is an operational flowchart illustrating a process for detecting and managing a violation (i.e., misbehavior or prohibited behavior) in a vehicle by utilizing feedback from at least one witness according to at least one embodiment.

Referring now to FIG. 3, an operational flowchart illustrating the exemplary vehicle violation detection and feedback management process 300 used by the program 110a, 110b according to at least one embodiment is depicted.

At 302, prohibited behavior is detected by the program 110a. Using a software program 108 on the user's device (e.g., user's computer 102), the prohibited behavior (i.e., violation) may be detected, through a Violation Detection Module that utilizes sensor data, as input into the program 110a, 110b via communications network 116. By utilizing sensors (e.g., GPS tracking device, acceleration and gyroscope sensors) associated with location tracking services (e.g., maps and allowed routes) within the vehicle 202 (i.e., violating vehicle), the prohibited behavior may be detected and then received by the program 110a, 110b. The program 110a may then emit an alarm (i.e., warning signal) to the driver of the violating vehicle 202, and the other vehicles 202, with a vehicle device 204, in close proximity to the violating vehicle.

For example, Vehicle Z was driving northbound on Main Avenue, when the driver of Vehicle Z (i.e., Driver Z) made a U-turn on Main Avenue at the intersection of Second Street to travel southbound on Main Avenue. As such, the vehicle device 204 associated with Vehicle Z (i.e., Vehicle Device Z) emits an alarm indicated by the steering wheel connected to Vehicle Z vibrating to notify Driver Z that the U-turn performed by Vehicle Z is a violation, and the head lights and tail lights connected to Vehicle Z blink for 15 seconds after Vehicle Z made the U-turn to notify surrounding vehicles that Vehicle Z was engaged in a violation or prohibited behavior.

In the present embodiment, the vehicle device 204 may be turned on or activated for the program 110a to detect the allegedly prohibited behavior of the driver (i.e., detected violation). However, in the present embodiment, once the vehicle device 204 in the violating vehicle detects the violation, the driver of the violating vehicle may be unable to deactivate or turn off the alarm emitted by the violating vehicle.

In the present embodiment, the type of warning signal emitted by the program 110a may depend on the manufacturer of the vehicle 202 associated with the vehicle device 204 and the specific settings programmed by the owner, operator or occupant of the vehicle 202. The user (e.g., owner, operator or occupant of the vehicle 202) may connect the vehicle device 204 to a computer display monitor (if not already connected). A screen may appear in which the "Settings" button is located on the bottom right side. Once the owner, operator or occupant of the vehicle 202 clicks on the "Settings" button, the owner, operator or occupant of the vehicle 202 may be prompted (e.g., via dialog box) to indicate the setting that the owner, operator or occupant of the vehicle 202 intends to change. In the list of settings, there may be a "Warning Signal/Alarm" button. If the owner, operator or occupant of the vehicle 202 clicks the "Warning Signal/Alarm" button, then the dialog box may expand the list of possible warning signals or alarms (e.g., honk horn, flash lights, display warning screen) that may be implemented by the specific vehicle 202. The owner, operator or occupant of the vehicle 202 may select the preferred warning signal. The dialog box may expand and prompt the owner, operator or occupant of the vehicle 202 to confirm the warning signal selection by clicking the "Yes" or "No" button under a statement restating the selected warning signal. Once the vehicle owner, operator or occupant clicks "Yes," the dialog box may disappear. If, however, the vehicle owner, operator or occupant selects the "No" button, then the dialog box may remain for the owner, operator or occupant of the vehicle 202 to clarify the selected warning signal.

In the present embodiment, the driver engaged in the allegedly prohibited behavior may be precluded from stopping the warning signal via the vehicle devices 204 associated with the surrounding vehicles 202. However, drivers in close proximity to the driver engaged in the allegedly prohibited behavior, via peer-to-peer communication, may stop the warning signal and simultaneously send feedback on the allegedly prohibited behavior.

In the present embodiment, the program 110a may detect the allegedly prohibited behavior of the driver that is within close proximity of the user. For example, if the driver engaged in the prohibited behavior is within 700 feet of the user, then the program 110a will detect the allegedly prohibited behavior.

In the present embodiment, the program 110a may detect the allegedly prohibited behavior that is within the direct path of the user. The program 110a may automatically determine the direct path of the user's vehicle 202 based on the time and date that the user's vehicle 202 is in motion, and the location of the user's vehicle 202 by utilizing a GPS tracking device associated with the user's vehicle 202, the cameras associated with the user's vehicle 202, or historical route data in the database 114. For example, if the user is leaving the home at 8:00 am on a weekday and the user's vehicle 202 starts traveling in the direction of the user's place of employment, then, based on the time and the direction that the user's vehicle 202 is traveling as indicated by a camera or GPS tracking device associated with the user's vehicle 202, the program 110a may determine that the user is heading to work and the direct path may be any routes that may lead to the user's place of employment.

In the present embodiment, the alarm emitted by the violating vehicle may serve as a warning to other surrounding vehicles that may unknowingly engage in similar or the same prohibited behavior. For example, Vehicle Y, directly behind Vehicle Z, was waiting to make a U-turn at the intersection of Main Avenue and Second Street, when the headlights and tail lights associated with Vehicle Z began to blink indicating that a U-turn at that intersection is a violation. The driver associated with Vehicle Y (i.e., Driver Y) was notified of this violation prior to making the U-turn. Therefore, Driver Y proceeds to continue driving northbound on Main Avenue, past the intersection of Second Street, until a legal U-turn can be made on Main Avenue.

In the present embodiment, the program 110a, 110b may learn the patterns of the user by sharing historical route data in the database 114, and if the user travels to a certain place at specific time or day, or takes a specific route to a specific destination, then the program 110a may utilize this data to determine the direct path of the user.

In the present embodiment, the program 110a, 110b may assume that the user abides by all applicable traffic laws and regulations under the local and state laws and codes. As such, the direct path generated by the program 110a, 110b may be paths or routes that are in accordance with all traffic laws and regulations applicable to the type of vehicle utilized by the user. For example, if the user is driving a commercial vehicle, then the program 110a, 110b may not provide information pertaining to the prohibited behavior of another driver, who is located on a roadway for passenger vehicles only.

Then, at 304, the program 110a determines if at least one witness is detected. Using the software program 108 on the user's device (e.g., user's computer 102), potential witnesses may be detected, through the Violation Detection Module that utilizes sensor data, as input into the program 110a, 110b via communications network 116. By utilizing sensors (e.g., GPS tracking device, acceleration and gyroscope sensors) associated with location tracking services within the vehicle 202, the program 110a via communications network 116 may search for and detect at least one potential witness based on whether the potential witness is within a specific distance, altitude, direction and orientation of the violating vehicle, and the potential witness is reliable. The witness may be utilized to provide feedback on the behavior of the driver engaged in the allegedly prohibited behavior. A detailed operational flowchart of the potential witness validity determination process in the program 110a, 110b will be described in greater detail below with respect to FIG. 4.

If the program 110a determines that there is no witness detected at 304, then the program 110a, 110b may record no witness information at 306. When the program 110a, 110b is unable to detect at least one potential witness located within a specific distance, altitude, direction and orientation of violating vehicle, who is reliable, to act as a witness to the detected violation performed by the violating vehicle, then the program 110a, 110b may record that no witness information is available. A detailed operational flowchart of the potential witness validity determination process in the program 110a, 110b will be described in greater detail below with respect to FIG. 4.

Continuing the previous example, if there are no potential witnesses within a specific distance, altitude, direction and orientation of Vehicle Z now traveling southbound on Main Avenue, who are reliable to act as a witness, the program 110a, 110b will record that no witness information is available to provide feedback on the detected U-turn performed by the Vehicle Z on Main Avenue.

If, however, the program 110a determines that there is at least one witness detected at 304, then program 110a, 110b determines if a positive feedback was received by the detected witness at 308. Feedback received may be binary, either positive or negative, where a positive feedback may repudiate that no violation occurred. The user may provide feedback directly onto the program 110a, 110b. The vehicle device 204 may be connected to a computer display monitor. When a violation is detected and witnesses are detected, a screen may appear on each of the vehicle devices 204 associated with each witness. Each witness may be prompted (e.g., via a dialog box) to provide feedback on the violating vehicle. The dialog box, for example, displays a question asking the witness whether a specific vehicle is engaged in prohibited behavior. Under the question, there are "Yes" or "No" buttons (i.e., green or red buttons in which a green or checkmark button may be the same as the "Yes" button, and a red or "X" button may be the same as the "No" button). If the witness selects the "No" button, then the witness is providing a positive feedback that the vehicle is not engaged in prohibited behavior. If, however, the witness selects the "Yes" button, then the witness is providing a negative feedback affirming that the vehicle is engaged in prohibited behavior. Once the witness selects a button, the dialog box disappears.

Continuing the previous example, the program 110a, 110b determines that there are three potential witnesses to the U-turn made by Vehicle Z. The potential witnesses include the Driver Y, the driver of Vehicle X (i.e., Driver X) and the driver of Vehicle W (i.e., Driver W). Each witness, Driver Y, Driver X and Driver W, receive a prompt on the liquid crystal display (LCD) monitor and/or GPS screen associated with each respective vehicle, via dialog box, to provide feedback on the behavior of Vehicle Z. The dialog box asks each witness whether Vehicle Z is engaged in an illegal U-turn on Main Avenue. Under the question, there are "No" or "Yes" buttons for the witnesses to provide feedback.

In the present embodiment, the feedback may also be indirect in which no particular action may be required by the witness. Indirect feedback may occur if a witness is present and able to observe a violation; however, the witness, for whatever reason, may be unwilling to provide feedback.

If the program 110a, 110b determines that the feedback provided by the witness is positive at 308, then the program 110a, 110b records the positive feedback received by the detected witness at 310. Using a software program 108 on the user's device (e.g., user's computer 102), the positive feedback received by the witness may be detected, through a Reconciliation Module (i.e., processing module that may correlate external updates to feedback received), as input into the program 110a, 110b via communications network 116. The positive feedback may then later be recorded in the knowledge base (namely, a global knowledge base). A detailed operational flowchart of the Reconciliation Module, and global and local knowledge bases updating process in the program 110a, 110b will be described in greater detail below with respect to FIG. 5.

Continuing the previous example, Driver X selects "No" when responding to the prompt on the GPS screen associated with Vehicle X with positive feedback thereby indicating that the U-turn performed by Vehicle Z is legal and permitted based on the local traffic rules pertaining to Main Avenue.

In the present embodiment, the program 110a, 110b may allot a certain amount of time for a witness to provide feedback on a detected violation. By default, the witness may be given 30 seconds to provide feedback on the detected violation.

Alternatively, the time allocated for witness feedback may be configurable. The program 110a, 110b may connect the vehicle device 204 to a computer display monitor (if not already connected). A screen may appear in which the "Settings" button is located on the bottom right side. Once the owner, operator or occupant of the vehicle 202 clicks on the "Settings" button, the owner, operator or occupant of the vehicle 202 may be prompted (e.g., via dialog box) to indicate the setting that the owner, operator or occupant of the vehicle 202 intends to change. In the list of settings, there may be a "Feedback Time" button. If the owner, operator or occupant of the vehicle 202 clicks the "Feedback Time" button, then the dialog box may expand the list of possible feedback time ranging from three seconds to ten minutes in increments of 15 or 30 seconds. The owner, operator or occupant of the vehicle 202 may select the preferred feedback time. The dialog box may expand and prompt the owner, operator or occupant of the vehicle 202 to confirm the preferred feedback time by clicking the "Yes" or "No" button under a statement restating the preferred feedback time. Once the vehicle owner, operator or occupant clicks "Yes," the dialog box may disappear. If, however, the vehicle owner, operator or occupant selects the "No" button, then the dialog box may remain for the owner, operator or occupant of the vehicle 202 to clarify the preferred feedback time.

In the present embodiment, the allotted feedback time of the program 110a, 110b may be adjusted (e.g., extended or shortened) depending on whether the witness has been prompted to provide feedback to multiple detected violations, whether the witness is in a moving vehicle and is thereby limited as to whether the witness can provide feedback within the allotted feedback time, and whether the witness vacated the vehicle shortly before or after the detected violation and may be unable to provide feedback within the allotted feedback time.

If, however, the program 110a, 110b determines that positive feedback was not received by the potential witness at 308, then the program 110a, 110b determines if a negative feedback was received by the detected witness at 312. If the witness fails to provide positive feedback on the violating vehicle, then the program 110a, 110b may, by default, determine that the witness provides negative feedback, either implicitly or explicitly, on the allegedly prohibited behavior engaged in by a specific vehicle.

Continuing the previous example, the program 110a, 110b determines that both Vehicles Y and W fail to provide positive feedback on the U-turn made by Vehicle Z on Main Avenue, within the allotted feedback time of 30 seconds for Driver Y and one minute for Driver W. Therefore, the program 110a, 110b determines whether the Drivers Y and W provide an explicit or implicit negative feedback on the detected violation by Vehicle Z.

If the program 110a, 110b determines that the feedback provided by the witness is negative at 312, then the program 110a, 110b records the explicit negative feedback received by the detected witness at 314. If, for example, the witness selects the "Yes" button when prompted via a dialog box on whether the violating vehicle is indeed engaged in prohibited behavior, then the program 110a, 110b may determine that the witness provided explicitly negative feedback against the violating vehicle.

Continuing the previous example, Driver W selects "Yes" when responding to the prompt on the LCD monitor associated with Vehicle W within 55 seconds of receiving the prompt to provide feedback on the detected violation performed by Vehicle Z. Therefore, Driver W provides an explicit negative feedback, indicating that the U-turn performed by Vehicle Z is illegal and prohibited behavior based on the local traffic rules pertaining to Main Avenue.

If, however, the program 110a, 110b determines that a negative feedback was not received by the potential witness at 312, then the program 110a, 110b records an implicit negative feedback at 316. Since the program 110a, 110b determines that neither a positive feedback at 308 and a negative feedback at 312 was received by the potential witness, the program 110a, 110b may consider the lack of feedback as an implicit negative feedback on the driver engaged in the allegedly prohibited behavior.

Continuing the previous example, the program 110a, 110b determines that Driver Y fails to respond to the prompt on the LCD monitor associated with Vehicle Y, within the allotted feedback time of 30 seconds. As such, the program 110a, 110b records an implicit negative feedback on behalf of Driver Y.

In the present embodiment, the program 110a, 110b may consider the absence of feedback as implicit negative feedback since psychologically a witness may be more willing to correct a situation or assist a person, when the witness notices that the person is being misjudged. For example, if a witness receives a notification that a driver is engaged in prohibited behavior and the witness knows that such behavior is not prohibited, then the witness is more inclined to report that driver did not commit a violation. If, however, the received notification was correct and the driver was engaged in prohibited behavior, then the witness is less inclined to confirm if no feedback will be considered the same as providing negative feedback confirming the prohibited behavior.

Regardless of whether no witness information was recorded at 306, positive feedback is recorded at 310, explicitly negative feedback is recorded at 314, or implicitly negative feedback is recorded at 316, the program 110a, 110b evaluates the information gathered at 318. The program 110a, 110b may evaluate the information gathered on the detected witnesses and the received feedback to determine whether enough information has been gathered to confirm that the driver is indeed in engaged in prohibited behavior.

Continuing the previous example, the program 110a, 110b evaluates the feedback received by Drivers X, Y and W, as well as the feedback history and weight of each witness, Drivers X, Y and W. Since the Driver W was closer to Vehicle Z than the other two witnesses, the feedback recorded by Driver W is given more weight than the other witnesses.

Then, at 320, the program 110b determines if the evaluated information is sufficient to confirm that the driver is engaged in prohibited behavior. The program 110b may analyze the number of times that the alleged violation occurred, and whether the feedback received by the witnesses and recorded by the program 110a, 110b in the present occurrences and previous occurrences is sufficient to determine whether the violation may remain as a violation, or may no longer be considered a violation but rather a change in the road rules.

Continuing the previous example, the program 110b weighs the evaluated feedback received by Drivers X, Y and W on the detected violation performed by Vehicle Z and reviews the navigational tools utilized to provide the maps and road rules associated with the intersection at Second Street and Main Avenue, as well as the historical data on U-turns at the intersection of Second Street and Main Avenue. The historical data includes feedback from previous U-turns made at that intersection. Based on the historical data, there have been 10 previous occurrences of vehicles making U-turns at the intersection of Main Avenue and Second Street, and feedback from the 10 previous occurrences indicate that U-turns at that intersection are illegal and violate the traffic laws at that intersection. In addition, the maps and road rules associated with that intersection further indicate that there are no U-turn signs located in the northbound and southbound lanes on Main Avenue at the intersection of Second Street.

In another embodiment, the determination on whether the gathered information may be sufficient may be configurable on an administration level by a centralized server system (e.g., cloud system) associated with the program 110b, since the determination may be valid for a large pool of users. A detailed operational flowchart of the global and local knowledge bases 324 updating process in the program 110a, 110b, which includes a cloud system as a centralized server system, will be described in greater detail below with respect to FIG. 5.

If the program 110b determines that the evaluated information is sufficient to determine whether the driver is engaged in prohibited behavior at 320, then the evaluated information is utilized to update knowledge bases 324 (e.g., database 114) (i.e., including first the updating of the global knowledge and then synchronizing of local knowledge base) that includes data associated with maps and allowed routes for vehicles 202 at 322. The knowledge bases 324 may be utilized to collect data (i.e., information) associated with the allegedly prohibited behavior, including feedback and historical data associated with the users (e.g., witness feedback history, driver behavior, use of the program 110a, 110b). The knowledge bases 324, including the local and global knowledge bases, may be updated accordingly. The evaluated information may first update and store in the global knowledge base (e.g., to elaborate the feedback and transform changes to the road rules), which is synchronized with the local knowledge base. A detailed operational flowchart of the global and local knowledge bases 324 updating process in the program 110a, 110b will be described in greater detail below with respect to FIG. 5.

Continuing the previous example, the program 110b determines that there is sufficient information to determine that the U-turn performed by Vehicle Z is illegal and affirms that Vehicle Z was indeed engaged in a violation. The gathered information and feedback on the U-turn performed by Vehicle Z is utilize to update the global knowledge base and will be saved in the global knowledge base.

In the present embodiment, an allegedly prohibited behavior may be considered allowed behavior based on feedback from other users. If an allegedly prohibited behavior receives feedback from other users indicating that the allegedly prohibited behavior is no longer prohibited, then the knowledge base 324 may monitor the number of occurrences for which such feedback is received by the program 110a, 110b. Once the number of occurrences surpasses a previously determined threshold, then the knowledge bases 324 associated with the program 110a, 110b (i.e., the global knowledge base) may be updated accordingly to no longer emit an alarm when the vehicle 202 performs the previously prohibited behavior. The threshold may be determined based on the popularity of the specific road and the driving frequency on the specific road. As such, the greater the popularity of the road and the greater the driving frequency, the higher the threshold (e.g., more occurrences may be necessary before a change to the road rules may be implemented and updated to the knowledge base). However, the lesser the popularity of the road and the lesser the driving frequency, the lower the threshold (e.g., less occurrences may be necessary before a change to the road rules may be implemented and updated to the knowledge base).

In another embodiment, the threshold may be configurable on an administration level by a centralized server system (e.g., cloud system) associated with the program 110b, since the determination may be valid for a large pool of users. A detailed operational flowchart of the global and local knowledge bases 324 updating process in the program 110a, 110b, which includes a cloud system as a centralized server system, will be described in greater detail below with respect to FIG. 5.

If, however, the program 110b determines that the evaluated information is not sufficient to confirm that the driver is engaged in prohibited behavior at 320, then the appropriate authorities are contacted at 326. The program 110b may be unable to determine whether the violation remains or if there is a change in the road rules. As such, the program 110b may contact the appropriate authorities to request an official feedback from the authority in charge to determine whether the violation remains or whether there has been a change in the road rules.

Continuing the previous example, if the program 110b did not have sufficient information to determine whether the U-turn made by Vehicle Z was a violation, then the program 110b would contact the local police department traffic unit to determine whether a U-turn at the intersection of Main Avenue and Second Street is illegal or in accordance with traffic laws.

In another embodiment, the program 110a, 110b may record and utilize the information provided by the contacted authorities to update the knowledge bases 324, namely updating the global knowledge base and then synchronizing the global knowledge base with the local knowledge base.

Figure 4:
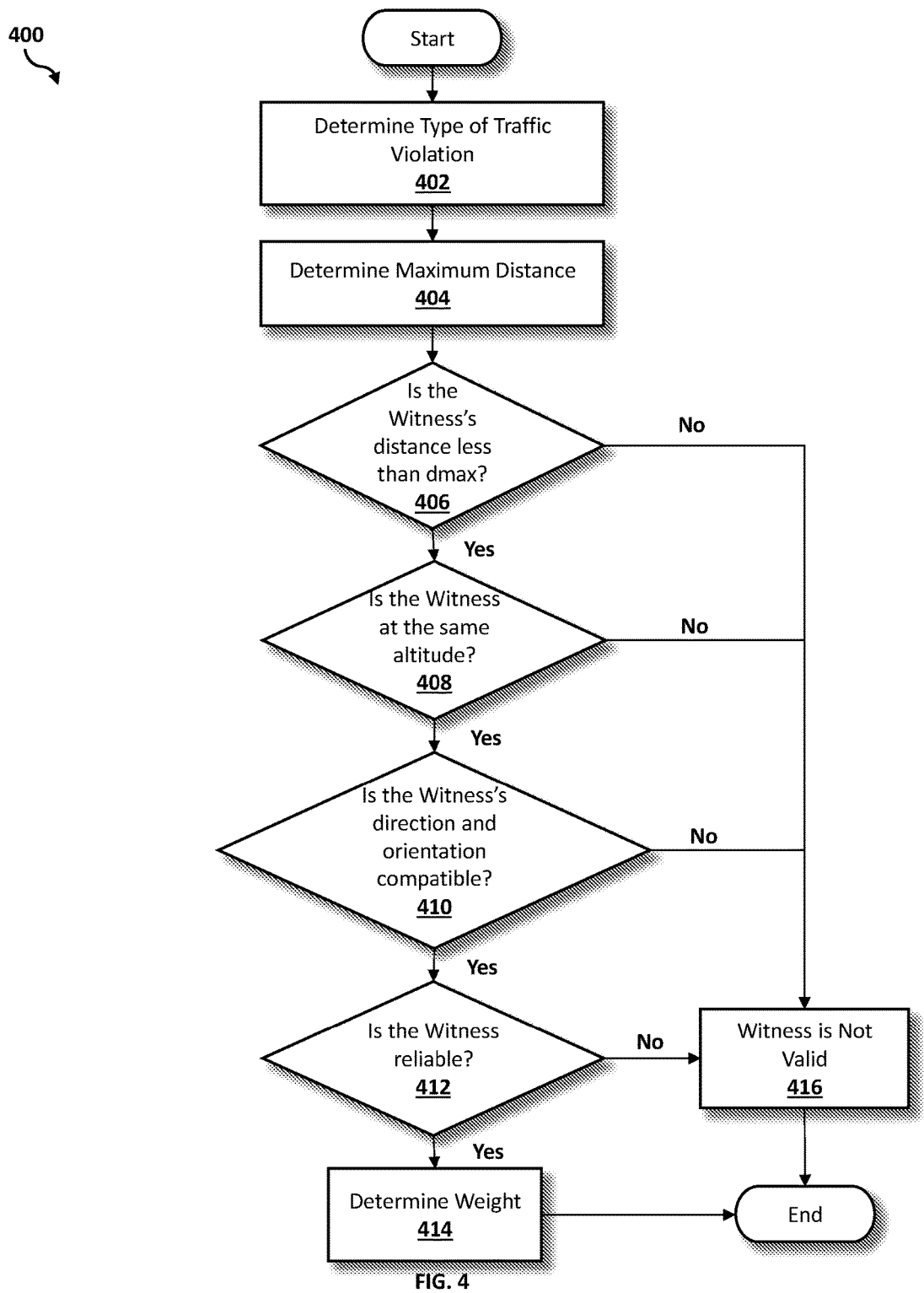
FIG. 4 is an operational flowchart illustrating a process for determining the validity of a potential witness after the detection of a violation according to at least one embodiment.

Referring now to FIG. 4, an operational flowchart illustrating the exemplary potential witness validation process 400 used by the program 110a, 110b according to at least one embodiment is depicted.

At 402, the type of traffic violation is identified by the program 110a, 110b. After the allegedly prohibited behavior is detected, the software program 108 on the user's device (e.g., user's computer 102) may determine the type of traffic violation, by utilizing sensors (e.g., GPS tracking device, acceleration and gyroscope sensors) associated with location tracking services (e.g., maps and allowed routes) within the vehicle 202, to recognize patterns of the allegedly prohibited behavior engaged in by the driver by the program 110a, 110b.

For example, Vehicle Z, which includes front end, rear end and side cameras, a GPS tracking device, and acceleration and gyroscope sensors, detects that the traffic violation engaged in by the driver associated with Vehicle Z (i.e., Driver Z) is a U-turn on the northbound lanes of Main Avenue at the intersection of Second Street.

Then, at 404, the maximum distance (i.e., dmax) from the vehicle 202 engaged in the allegedly prohibited behavior is determined by the program 110a, 110b. The program 110a, 110b may determine the dmax based on the time (e.g., hour of the day), the road conditions and the street lighting. These factors may be utilized by a triangulation algorithm to determine the dmax between the vehicle 202 engaged in the allegedly prohibited behavior and the other vehicles. The dmax may be utilized to determine whether a vehicle is in close proximity to the vehicle engaged in the allegedly prohibited behavior, and whether a user may be a valid witness to the allegedly prohibited behavior.

Continuing the previous example, since Vehicle Z engaged in the U-turn at three o-clock in the afternoon on a sunny day with high visibility and minimal traffic on Main Avenue and Second Street, the program 110a, 110b determines that the dmax is 200 feet from Vehicle Z.

In the present embodiment, the program 110a, 110b may consider weather conditions, accidents, construction, traffic patterns, street closures, protests, or other traffic delays to determine the dmax from the vehicle 202 engaged in the allegedly prohibited behavior. Additionally, the program 110a, 110b may consider whether there are obstructions (e.g., trees, buildings, scaffolds) that may affect the line of sight for a witness to the detected violation.

Then, at 406, the program 110a, 110b determines if the distance of the witness from the violating vehicle (i.e., vehicle 202 engaged in the allegedly prohibited behavior) is less than dmax.

Continuing the previous example, the program 110a, 110b determines that there are seven witnesses to the detected violation by Vehicle Z. The seven witnesses include drivers associated with Vehicles X, Y, W, U, V, T and S. Each of the seven witnesses are located less than 200 feet of Vehicle Z, when Driver Z made the U-turn on the intersection of Main Avenue and Second Street.

If the program 110a, 110b determines that the distance of the witness from the violating vehicle is less than dmax at 406, then the program 110a, 110b determines if the witness is at the same altitude of the violating vehicle at 408.

Continuing the previous example, the program 110a, 110b determines that of the seven witnesses located less than 200 feet from Vehicle Z at the time that the violation occurred, six of the witnesses, Vehicles X, Y, W, U, V and T were located at the same altitude as Vehicle Z when the violation occurred. Although Vehicle S was located 160 feet away from Vehicle Z when the violation occurred, Vehicle S was located at the bottom of an incline located 60 feet north of the intersection of Main Avenue and Second Street. Vehicle S is located at a different altitude than Vehicle Z when the violation occurred. Therefore, the driver associated with Vehicle S (i.e., Driver S) is an invalid witness to the U-turn performed by Vehicle Z at the intersection of Main Avenue and Second Street.

If the program 110a, 110b determines that the witness is at the same altitude of the violating vehicle at 408, then the program 110a, 110b determines if the direction and orientation of the witness is compatible with the violation detected at 410. The program 110a, 110b may generate a set of rules regarding the direction and orientation with the type of violation detected at 402.

Continuing the previous example, the following Table 1 shows the rules associated with the relative direction and orientation of the witness to the violation that may be stored in the knowledge base 324 (namely, the global knowledge base) with the corresponding portion of the map and associated routes:

TABLE 1

| | Relative Positions of the Witness Vehicle to Violating Vehicle | | | |
|---|---|---|---|---|
| Infraction type | Same direction and traveling (or is stopped) behind | Same direction and traveling (or is stopped) in front of | Opposite direction and approaching (or is stopped) | Opposite direction and is moving away (or is stopped) |
| Prohibited U-turn | YES | YES | YES | NO |
| Prohibited use of emergency lane for normal transit in traffic jam situations | NO | YES | NO | NO |
| Prohibited overtaking | YES | YES-if Witness Vehicle is the vehicle being overtaken | YES | NO |
| Running Red Light OR Stop Sign | YES | NO | YES-in addition Witness Vehicles on the crossing lane are valid witnesses | NO |
| Failure to give way | YES | NO | YES-in addition Witness Vehicles on the crossing lane are valid witnesses | NO |

Continuing the previous example, the program 110a, 110b determines that of the remaining six witnesses, four of the witnesses were located in a compatible direction and orientation to Vehicle Z, when the violation occurred. The drivers associated with Vehicles T and U (i.e., Drivers T and U) were traveling in a direction and an orientation incompatible to Vehicle Z, when the violation occurred. Vehicle T was traveling northbound on Main Avenue approximately 130 feet away from the intersection of Second Street. Vehicle U was stopped at a traffic light approximately 180 feet eastbound on Second Street facing away from the intersection of Main Avenue. Therefore, Drivers U and T are invalid witnesses to the U-turn performed by Vehicle Z at the intersection of Main Avenue and Second Street.

If the program 110a, 110b determines that the direction and orientation of the witness is compatible with the violation detected at 410, then the program 110a, 110b determines if the witness is reliable at 412. The program 110a, 110b may analyze the previous feedback provided by the witness and whether the past feedback provided was in accordance with the road rules and maps.

Continuing the previous example, the program 110a, 110b determines that of the remaining four witnesses, three of the witnesses are reliable. Three witnesses, Drivers X, Y and W have historically provided useful feedback in determining whether past violating vehicles were engaged in at least one prohibited behavior. However, Driver V has failed to provide useful feedback to previous detected violations. In fact, several of the feedbacks provided by Driver V contradict traffic laws even when associated navigational tools indicate that signs were present indicating the illegality of the prohibited behavior. As a result, the Driver V is considered to not be a reliable witness for detected violations. Therefore, Driver V is an invalid witness to the U-turn performed by Vehicle Z at the intersection of Main Avenue and Second Street.

If the program 110a, 110b determines that the witness is reliable at 412, then the program 110a, 110b determines a weight of the feedback provided by the witness at 414. Based on the relative position of the witness and the historical data associated with the witness on the program 110a, 110b, the program 110a, 110b may determine the amount of weight to place on the feedback provided by the witness.

Continuing the previous example, the program 110a, 110b determines that the feedback provided by Driver W has the highest weight compared to the feedback provided by Driver X with the lowest weight. Vehicle W was traveling southbound on Main Avenue approximately 10 feet from the intersection of Second Street, when the violation occurred. Since Vehicle W is located the closest to Vehicle Z when the violation occurred and the historical data indicates that 95% of the feedback provided by Driver W has been deemed useful by the program 110a, 110b, the feedback provided by Driver W is given the highest weight. Then, Vehicle Y was stopped 15 feet behind Vehicle Z in a northbound lane of Main Avenue, when the violation occurred. In addition, the Driver Y rarely provides feedback associated with previous detected violations, and of the few feedbacks provided by Driver Y, 70% of the feedback has been deemed useful by the program 110a, 110b. Lastly, Vehicle X was traveling westbound on Second Street approximately 105 feet from Main Avenue. In addition, the Driver X has a history of providing generally useful feedback in which 70% of the feedback has been deemed useful by the program 110a, 110b. As such, the lowest weight has been applied to the feedback provided by Driver X.

If, however, the program 110a, 110b determines that the distance of the witness from the violating vehicle is equal to or more than dmax at 406, that the witness is not at the same altitude of the violating vehicle at 408, that the direction and orientation of the witness is not compatible with the violation detected at 410, or that the witness is not reliable at 412, then the program 110a, 110b determines that the witness is not valid at 416.

Continuing the previous example, as described above, the program 110a, 110b determines that the potential witnesses, Drivers S, T, U and V, were not valid witnesses for the detected violation engaged in by Vehicle Z at the intersection of Second Street and Main Avenue.

In another embodiment, a surrounding vehicle or pedestrian may manually request to be considered a witness for a detected violation. The program 110a, 110b may connect the vehicle device 204 to a computer display monitor (if not already connected). A screen, for example, may appear in which the "Report" button is located on the bottom left side. Once the potential witness clicks on the "Report" button, the program 110a, 110b may provide a map indicate the detected violations nearby for the potential witness to indicate a specific detected violation that the potential witness intends to report. The program 110a, 110b may then utilize sensors and data location tracking devices associated with the user's device to determine the location of the potential witness. The program 110a, 110b may determine whether the distance of the potential witness is less than the dmax from the violating vehicle, whether the potential witness is at the same altitude as the violating vehicle, whether the potential witness was located in a direction and an orientation compatible to the violating vehicle, and whether the potential witness is reliable. If the program 110a, 110b determines that the potential witness is valid, then the potential witness may be prompted (e.g., via dialog box) to provide feedback on the detected violation. A dialog box, for example, displays a question asking the potential witness whether a specific vehicle is engaged in prohibited behavior. Under the question, there are "Yes" or "No" buttons. If the witness selects the "No" button, then the witness is providing a positive feedback that the vehicle is not engaged in prohibited behavior. If, however, the witness selects the "Yes" button, then the witness is providing a negative feedback affirming that the vehicle is engaged in prohibited behavior. Once the witness selects a button, the dialog box disappears.

Figure 5:
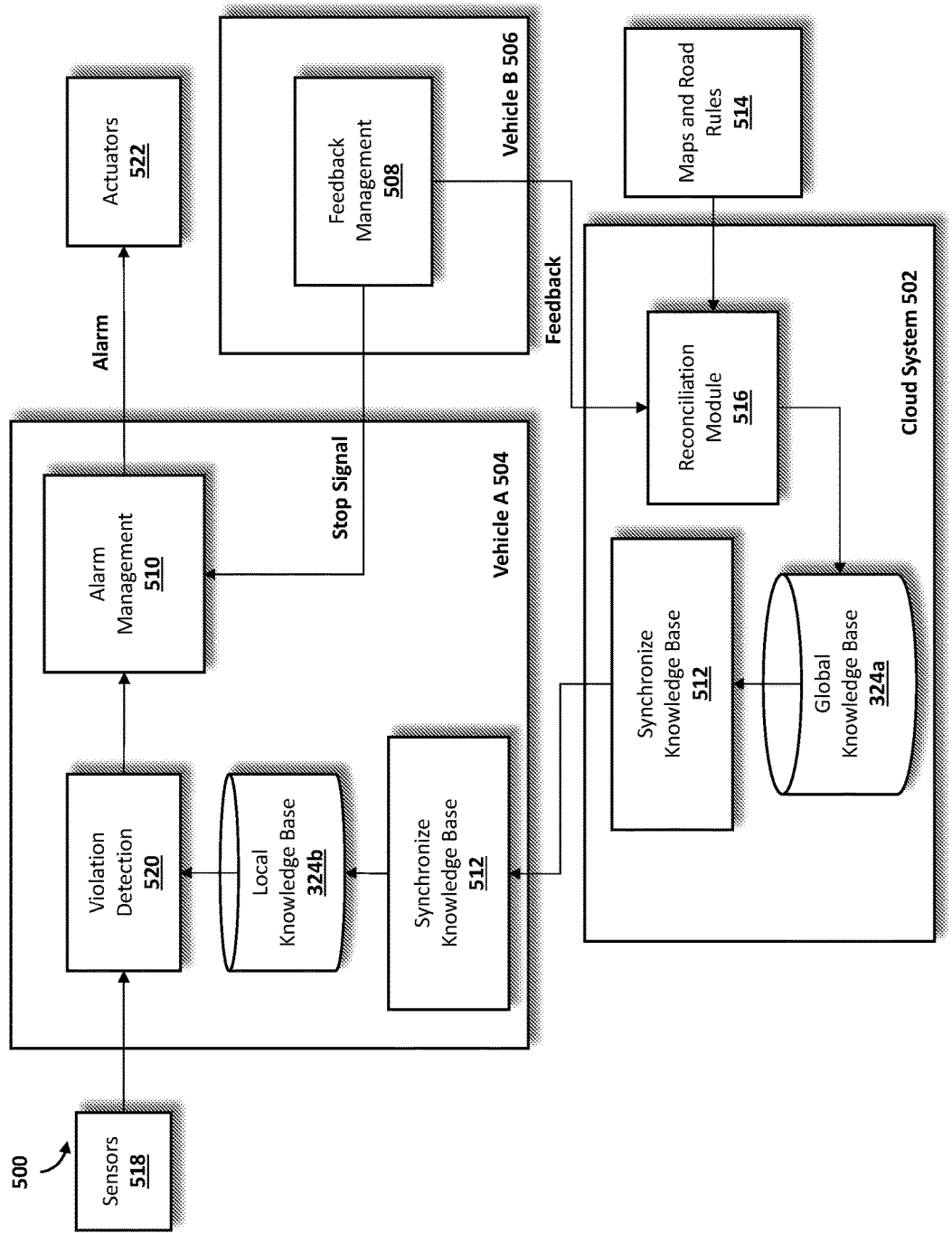
FIG. 5 is an operational flowchart illustrating a process for updating local and global knowledge bases associated with the program according to at least one embodiment.

Referring now to FIG. 5, an operational flowchart illustrating the exemplary local and global knowledge bases updating process 500 used by the program 110a, 110b according to at least one embodiment is depicted.

As shown, the program 110a, 110b may comprise two knowledge bases 324 (i.e., database 114): global knowledge base 324a and local knowledge base 324b. The global knowledge base 324a may be located in a cloud system 502 (e.g., program 110b). The global knowledge base 324a may receive feedback from the users of the program 110a, 110b via the Feedback Management 508 (e.g., processing module for collecting feedback from the witnesses and updating the global knowledge base 324a accordingly).

For example, the global knowledge base 324a includes information that the speed limit (on a given map portion) is given value V1, and the alarm is triggered when vehicle A 504 exceeds that speed limit. If the feedback from the witnesses state that no violation occurred, then the limit is raised in the global knowledge base 324a to V1+delta, where delta is a value that can be configured.

Additionally, the V1+delta may be increased by increments until the proper value is reached. If, for example, the speed limit is 50 kilometers per hour and the feedback states no violation occurred (and, as a consequence, the speed limit is incorrect), the program 110a, 110b will increase the speed limit to 55 kilometers per hour. If the feedback again states that no violation occurred, when a vehicle exceeds 55 kilometers per hour, the speed limit can be raised to 60 kilometers per hour, and again until the violation is correctly detected and there is no feedback to change the speed limit.

The program 110a, 110b may match the feedback received by the Feedback Management 508 with potential external updates, by the Reconciliation Module 516 in which maps and road rules 514 may be uploaded into, to prevent overwriting.

The global knowledge base 324a may include maps (e.g., geographical, topological) and a set of road rules 514 for each portion of the map, which may be uploaded into the Reconciliation Module 516. The road rules 514, for example, include the speed limit, and whether certain driving maneuvers (e.g., U-turns, overtaking) are permitted. The violation detection module 520 may match the behavior of the vehicle with the set of road rules 514 to determine whether the driver of the vehicle is engaged in a prohibited behavior.

In the present embodiment, the maps and roads rules 514 may be periodically updated in accordance with updates received by navigational tools and mechanisms associated with the global knowledge base 324*a*.

In another embodiment, the global knowledge base 324*a* may be loaded for the first time with maps and road rules, which may include an input module to load, and then update, the road rules 514. The road rules 514 may then be updated based on the feedbacks received by the Feedback Management 508.

The local knowledge base 324*b* may be located in Vehicle A (i.e., violating vehicle) 504, and the local knowledge base 324*b* may be comprised of the same data as the global knowledge base 324*a*. Then, at 512, the global knowledge base 324*a* may regularly synchronize with the local knowledge base 324*b*. Alternatively, the synchronization of the knowledge bases 324 may be configured. For example, the updates may be pushed when a vehicle connection is established and the program 110*a*, 110*b* may detect that newer updates are available with respect to a timestamp in the local knowledge base 324*b*.

By utilizing sensors 518 (e.g., cameras, GPS tracking device, acceleration and gyroscope sensors), a Violation Detection module 520 may activate an Alarm Management 510 (i.e., processing module in charge of starting and stopping the alarm), which may be located in Vehicle A 504 (e.g., program 110*a*). Based on previous feedback included in the Feedback Management 508, the Alarm Management 510 may emit a warning signal (i.e., alarm), or stop the signal based on the feedback received by the Feedback Management 508 in Vehicle B (i.e., witness vehicle) 506. If the warning signal is emitted by the Alarm Management 510, then the program 110*a*, 110*b* may emit the warning signal to the driver of the violating vehicle and the other drivers in close proximity to the violating vehicle via actuators 522 located in Vehicle A 504. The type of actuators that may be utilized by Vehicle A 504 depends on the specific manufacturers, since an actuator may exist when the vehicle is initially manufactured (e.g., horns, flashing lights), or an actuator may be installed in Vehicle A 504 after the vehicle is manufactured (e.g., alarms sirens, steering wheel vibrations).

In another embodiment, the sensors 518 and actuators 522 associated with Vehicles A and B may be connected to a vehicle intelligent system connected to the program 110*a*, 110*b* within the respective vehicles. As such, the data transmitted by the sensors 518 and the alarm emitted by the actuators 522 may be transmitted via communication network 116 through the intelligent system associated with the vehicle device 204 connected to the program 110*a*, 110*b*.

In another embodiment, the Alarm Management 510 may emit different levels of alarms via the actuators 522, which are triggered based on the type of violation detected by the sensors 518.

In another embodiment, the program 110*a*, 110*b* may utilize pedestrians in close proximity to the violating vehicle as witnesses. Using the software program 108 on the user's device (e.g., user's computer 102), pedestrians may be detected as potential witnesses (e.g., Vehicle B 506), through the Feedback Management 508, for input into the program 110*a*, 110*b* via communications network 116. As such, pedestrians may input feedback on the violating vehicle via the user's device (e.g., smart phone).

It may be appreciated that FIGS. 2-5 provide only an illustration of one embodiment and do not imply any limitations with regard to how different embodiments may be implemented. Many modifications to the depicted embodiment(s) may be made based on design and implementation requirements.

Figure 6:
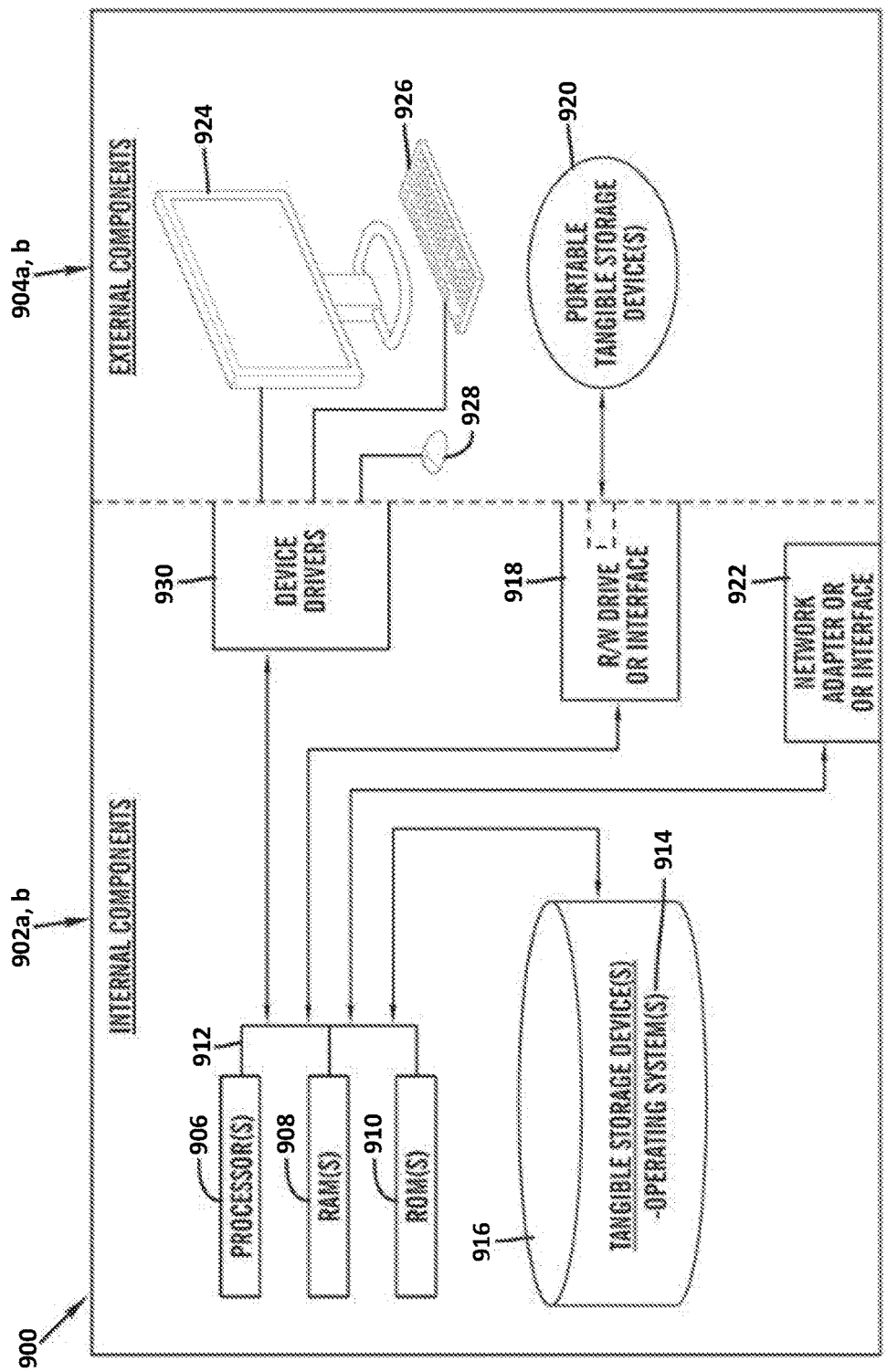
FIG. 6 is a block diagram of internal and external components of computers and servers depicted in FIG. 1 according to at least one embodiment.

FIG. 6 is a block diagram 900 of internal and external components of computers depicted in FIG. 1 in accordance with an illustrative embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 6. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108 and the program 110*a* in client computer 102, and the program 110*b* in network server 112, may be stored on one or more computer-readable tangible storage devices 916 for execution by one or more processors 906 via one or more RAMs 908 (which typically include cache memory). In the embodiment illustrated in FIG. 6, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the program 110*a*, 110*b* can be stored on one or more of the respective portable computer-readable tangible storage devices 920, read via the respective R/W drive or interface 918, and loaded into the respective hard drive 916.

Each set of internal components 902 *a, b* may also include network adapters (or switch port cards) or interfaces 922 such as a TCP/IP adapter cards, wireless Wi-Fi interface cards, or 3G or 4G wireless interface cards or other wired or wireless communication links. The software program 108 and the program 110a in client computer 102 and the program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the program 110a in client computer 102 and the program 110b in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
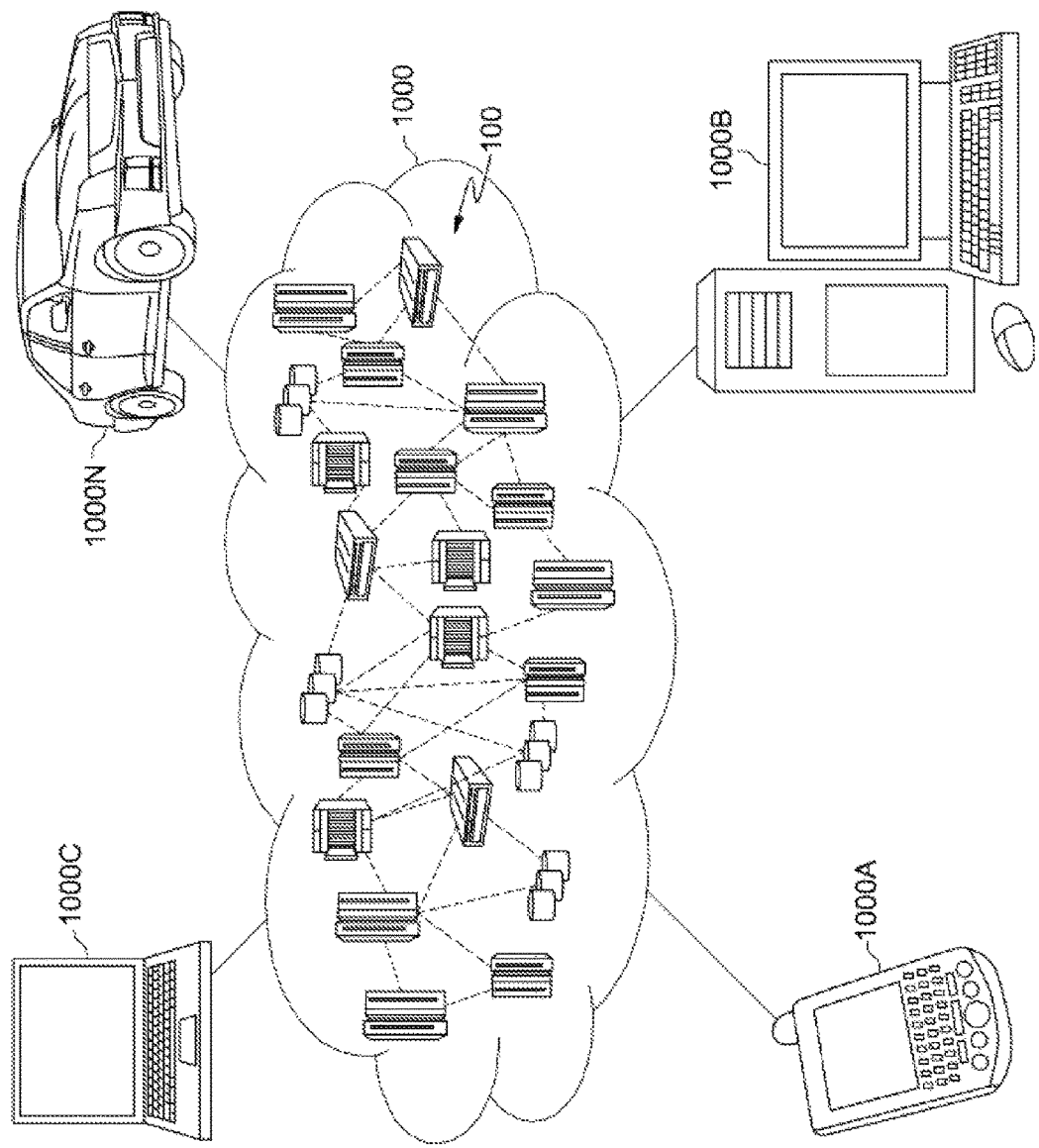
FIG. 7 is a block diagram of an illustrative cloud computing environment including the computer system depicted in FIG. 1, in accordance with an embodiment of the present disclosure.

Referring now to FIG. 7, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 7 are intended to be illustrative only and that computing nodes 100 and cloud computing environment 1000 can communicate with any type of computerized device over any type of network and/or network addressable connection (e.g., using a web browser).

Figure 8:
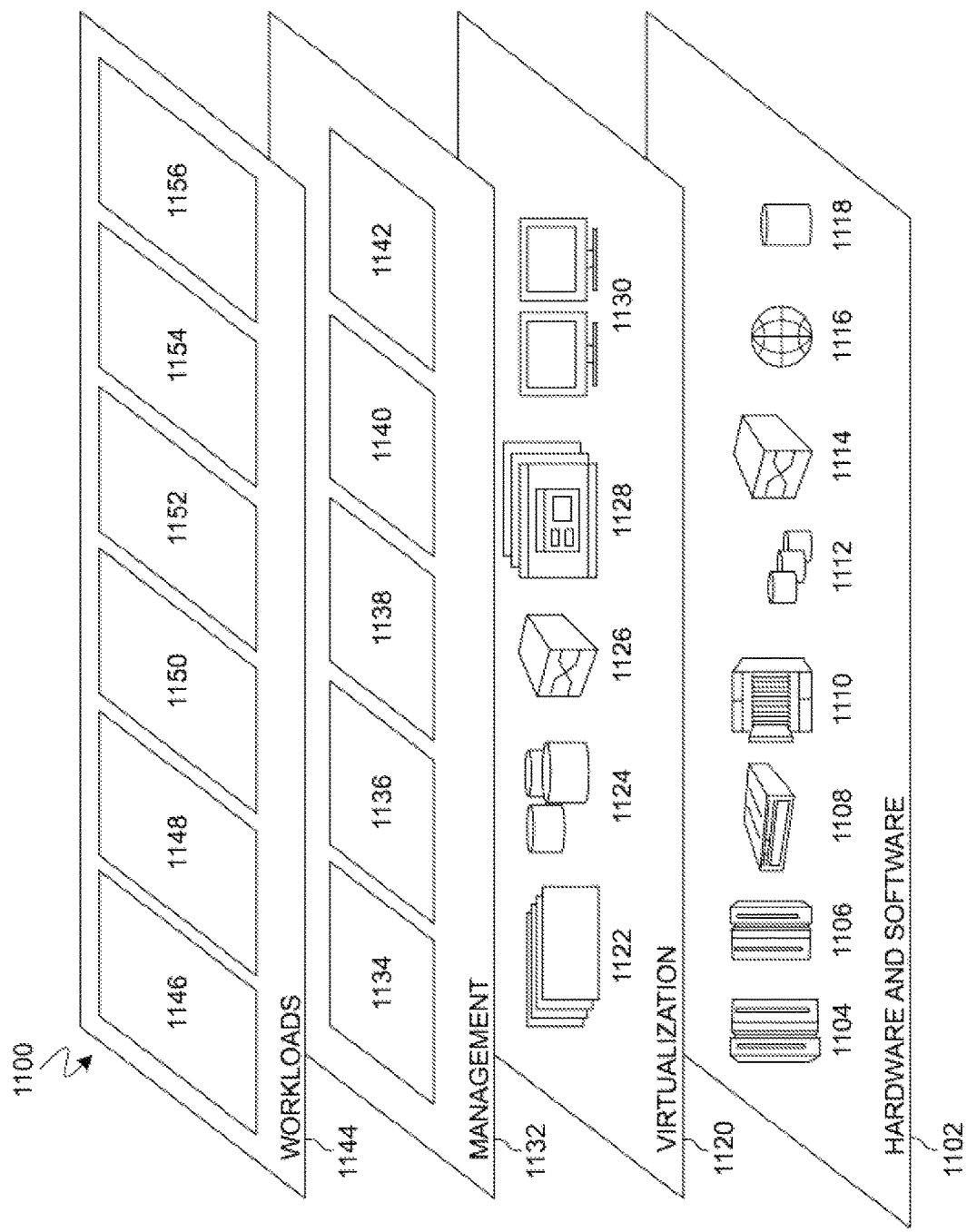
FIG. 8 is a block diagram of functional layers of the illustrative cloud computing environment of FIG. 7, in accordance with an embodiment of the present disclosure.

Referring now to FIG. 8, a set of functional abstraction layers 1100 provided by cloud computing environment 1000 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and vehicle behavior detection 1156. A program 110a, 110b provides a way to detecting intentional misbehavior in a vehicle driver based on witness feedback and location tracking services.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for detecting and managing a vehicle violation by utilizing a plurality of feedback, the method comprising:
    detecting a violation by a violating vehicle by utilizing sensors associated with the vehicle, wherein the vehicle includes a vehicle device, wherein a plurality of nearby vehicles are notified of the detected violation by emitting an alarm by utilizing at least one actuator from the violating vehicle;
    detecting at least one witness for the detected violation by the violating vehicle;
    recording at least one piece of feedback associated with the plurality of feedback received by at least one detected witness;
    evaluating the recorded feedback and a plurality of gathered information on the detected violation by the violating vehicle,
        wherein the evaluated plurality of gathered information includes a set of historical data associated with a feedback history of each of the detected at least one witness and a set of historical data associated with a personal driving behavior of the detected at least one witness,
        wherein the set of historical data associated with the feedback history of each of the detected at least one witness includes a determination to whether one or more past feedbacks from the detected at least one witness aligns with one or more other potential witnesses in connection with one or more past violations;
    determining a sufficiency of the evaluated feedback and the evaluated plurality of gathered information to verify whether the detected violation is valid based on a plurality of road rules and maps, wherein the evaluated feedback and the evaluated plurality of gathered information is compared to a threshold to determine the validity of the detected violation; and
    storing the determined feedback and the determined plurality of gathered information in a global knowledge base.

2. The method of claim 1, further comprising:
    determining the evaluated feedback and the evaluated plurality of gathered information is insufficient to verify whether the detected violation is valid based on the plurality of road rules and maps; and contacting an appropriate authority to verify whether the detected violation is valid.

3. The method of claim 1, wherein recording at least one piece of feedback received by at least one detected witness, further comprises:
  recording a positive feedback by the detected at least one witness to indicate that the prohibited behavior of the violating vehicle fails to be considered a violation;
  recording an explicit negative feedback by the detected at least one witness to indicate that the prohibited behavior of the violating vehicle is a violation; and
  recording the lack of feedback as an implicit negative feedback, wherein the prohibited behavior of the violating vehicle is a violation.

4. The method of claim 1, wherein detecting at least one witness to the detected violation by the vehicle, further comprises:
  determining a type of traffic violation engaged in by the vehicle by utilizing pattern recognition of a behavior engaged in by the vehicle; and
  determining a maximum distance from the vehicle and detected at least one witness.

5. The method of claim 4, further comprising:
  determining an actual distance of the detected at least one witness is less than the determined maximum distance.

6. The method of claim 5, further comprising:
  determining an altitude of the vehicle; and
  determining an actual altitude associated with the detected at least one witness is the same as the determined altitude of the vehicle.

7. The method of claim 6, further comprising:
  determining a direction and an orientation of the vehicle; and
  determining an actual direction and an actual orientation associated with the detected at least one witness is compatible to the determined direction and the determined orientation of the vehicle.

8. The method of claim 7, further comprising:
  determining the detected at least one witness is reliable; and
  determining a weight for the feedback received by the detected at least one witness based on a relative position and the set of data associated with the feedback history of each of the detected at least one witness.

9. The method of claim 1, further comprising:
  receiving a plurality of maps and road rules by utilizing a reconciliation module;
  transmitting the received plurality of maps and road rules to a global knowledge base, wherein the global knowledge base is updated with the transmitted plurality of maps and road rules;
  synchronizing the transmitted plurality of maps and road rules included in the global knowledge base with the corresponding transmitted plurality of maps and road rules in a local knowledge base located in the vehicle;
  updating the local knowledge base with the transmitted plurality of maps and road rules; and
  determining whether a violation is detected based on the updated local knowledge base.

10. A computer system for detecting and managing a vehicle violation by utilizing a plurality of feedback, comprising:
  one or more processors, one or more computer-readable memories, one or more computer-readable tangible storage medium, and program instructions stored on at least one of the one or more tangible storage medium for execution by at least one of the one or more processors via at least one of the one or more memories, wherein the program instructions to cause the computer system to perform a method comprising:
  detecting a violation by a violating vehicle by utilizing sensors associated with the vehicle, wherein the vehicle includes a vehicle device, wherein a plurality of nearby vehicles are notified of the detected violation by emitting an alarm by utilizing at least one actuator from the violating vehicle;
  detecting at least one witness for the detected violation by the violating vehicle;
  recording at least one piece of feedback associated with the plurality of feedback received by at least one detected witness;
  evaluating the recorded feedback and a plurality of gathered information on the detected violation by the violating vehicle,
    wherein the evaluated plurality of gathered information includes a set of historical data associated with a feedback history of each of the detected at least one witness and a set of historical data associated with a personal driving behavior of the detected at least one witness,
    wherein the set of historical data associated with the feedback history of each of the detected at least one witness includes a determination to whether one or more past feedbacks from the detected at least one witness aligns with one or more other potential witnesses in connection with one or more past violations;
  determining a sufficiency of the evaluated feedback and the evaluated plurality of gathered information to verify whether the detected violation is valid based on a plurality of road rules and maps, wherein the evaluated feedback and the evaluated plurality of gathered information is compared to a threshold to determine the validity of the detected violation; and
  storing the determined feedback and the determined plurality of gathered information in a global knowledge base.

11. The computer system of claim 10, wherein the program instructions, further executable least one of the one or more processors via at least one of the one or more memories, further comprise program instructions to cause the computer system to perform a method, further comprising:
  determining the evaluated feedback and the evaluated plurality of gathered information is insufficient to verify whether the detected violation is valid based on the plurality of road rules and maps; and
  contacting an appropriate authority to verify whether the detected violation is valid.

12. The computer system of claim 10, wherein the program instructions, further executable least one of the one or more processors via at least one of the one or more memories, further comprise program instructions to cause the computer system to perform a method,
  wherein recording at least one piece of feedback received by at least one detected witness, further comprises:
  recording a positive feedback by the detected at least one witness to indicate that the prohibited behavior of the violating vehicle fails to be considered a violation;
  recording an explicit negative feedback by the detected at least one witness to indicate that the prohibited behavior of the violating vehicle is a violation; and
  recording the lack of feedback as an implicit negative feedback, wherein the prohibited behavior of the violating vehicle is a violation.

13. The computer system of claim 10, wherein the program instructions, further executable least one of the one or more processors via at least one of the one or more memories, further comprise program instructions to cause the computer system to perform a method,
wherein detecting at least one witness to the detected violation by the vehicle, further comprises:
determining a type of traffic violation engaged in by the vehicle by utilizing pattern recognition of a behavior engaged in by the vehicle; and
determining a maximum distance from the vehicle and detected at least one witness.

14. The computer system of claim 13, wherein the program instructions, further executable least one of the one or more processors via at least one of the one or more memories, further comprise program instructions to cause the computer system to perform a method, further comprising:
determining an actual distance of the detected at least one witness is less than the determined maximum distance.

15. The computer system of claim 14, wherein the program instructions, further executable least one of the one or more processors via at least one of the one or more memories, further comprise program instructions to cause the computer system to perform a method, further comprising:
determining an altitude of the vehicle; and
determining an actual altitude associated with the detected at least one witness is the same as the determined altitude of the vehicle.

16. The computer system of claim 15, wherein the program instructions, further executable least one of the one or more processors via at least one of the one or more memories, further comprise program instructions to cause the computer system to perform a method, further comprising:
determining a direction and an orientation of the vehicle; and
determining an actual direction and an actual orientation associated with the detected at least one witness is compatible to the determined direction and the determined orientation of the vehicle.

17. The computer system of claim 16, wherein the program instructions, further executable least one of the one or more processors via at least one of the one or more memories, further comprise program instructions to cause the computer system to perform a method, further comprising:
determining the detected at least one witness is reliable; and
determining a weight for the feedback received by the detected at least one witness based on a relative position and the set of data associated with the feedback history of each of the detected at least one witness.

18. The computer system of claim 10, wherein the program instructions, further executable least one of the one or more processors via at least one of the one or more memories, further comprise program instructions to cause the computer system to perform a method, further comprising:
receiving a plurality of maps and road rules by utilizing a reconciliation module;
transmitting the received plurality of maps and road rules to a global knowledge base, wherein the global knowledge base is updated with the transmitted plurality of maps and road rules;
synchronizing the transmitted plurality of maps and road rules included in the global knowledge base with the corresponding transmitted plurality of maps and road rules in a local knowledge base located in the vehicle;
updating the local knowledge base with the transmitted plurality of maps and road rules; and
determining whether a violation is detected based on the updated local knowledge base.

19. A computer program product for detecting and managing a vehicle violation by utilizing a plurality of feedback, the computer program product comprising a computer readable storage medium having program instructions embodied therewith, wherein the computer readable storage medium is not a transitory signal per se, the program instructions executable by a processor to cause the processor to perform a method comprising:
detecting a violation by a violating vehicle by utilizing sensors associated with the vehicle, wherein the vehicle includes a vehicle device, wherein a plurality of nearby vehicles are notified of the detected violation by emitting an alarm by utilizing at least one actuator from the violating vehicle;
detecting at least one witness for the detected violation by the violating vehicle;
recording at least one piece of feedback associated with the plurality of feedback received by at least one detected witness;
evaluating the recorded feedback and a plurality of gathered information on the detected violation by the violating vehicle,
wherein the evaluated plurality of gathered information includes a set of historical data associated with a feedback history of each of the detected at least one witness and a set of historical data associated with a personal driving behavior of the detected at least one witness,
wherein the set of historical data associated with the feedback history of each of the detected at least one witness includes a determination to whether one or more past feedbacks from the detected at least one witness aligns with one or more other potential witnesses in connection with one or more past violations;
determining a sufficiency of the evaluated feedback and the evaluated plurality of gathered information to verify whether the detected violation is valid based on a plurality of road rules and maps, wherein the evaluated feedback and the evaluated plurality of gathered information is compared to a threshold to determine the validity of the detected violation; and
storing the determined feedback and the determined plurality of gathered information in a global knowledge base.

20. The computer program product of claim 19, wherein the program instructions, further executable least one of the one or more processors via at least one of the one or more memories, further comprise program instructions to cause the computer program product to perform a method, further comprising:
determining the evaluated feedback and the evaluated plurality of gathered information is insufficient to verify whether the detected violation is valid based on the plurality of road rules and maps; and
contacting an appropriate authority to verify whether the detected violation is valid.

* * * * *

UNITED STATES PATENT AND TRADEMARK OFFICE
CERTIFICATE OF CORRECTION

PATENT NO. : 10,360,793 B1
APPLICATION NO. : 15/985898
DATED : July 23, 2019
INVENTOR(S) : Eliseba Costantini et al.

Page 1 of 1

It is certified that error appears in the above-identified patent and that said Letters Patent is hereby corrected as shown below:

On the Title Page

Item (54), change the title from "PREVENTING VEHICLE ACCIDENT CAUSED BY INTENTIONAL MISBEHAVIOR" to read --DETECTING AND MANAGING A VEHICLE VIOLATION UTILIZING A PLURALITY OF FEEDBACK--

Signed and Sealed this
Tenth Day of September, 2019

Andrei Iancu
*Director of the United States Patent and Trademark Office*